United States Patent Office 2,928,822
Patented Mar. 15, 1960

2,928,822

PROTEINACEOUS FOOD ADJUNCT AND METHOD OF PREPARING SAME

Vernon L. Johnsen, La Grange, and Raymond S. Burnett, Chicago, Ill., assignors to Wilson & Co., Inc., a corporation of Delaware No Drawing. Application November 29, 1957
Serial No. 699,488

8 Claims. (Cl. 260—117)

This invention relates to proteinaceous material derived from collagen and associated proteins and the method of making same. More particularly, it relates to a non-gelling type of proteinaceous material having properties giving it utility in the food, cosmetic and pharmaceutical fields. Still more particularly, it relates to a proteinaceous food product having foaming properties.

In order to be useful for incorporation in food, cosmetic and pharmaceutical products, it is ordinarily desirable that an agent be low in color, have a low ash content and be bland with regard to flavor and odor. Collagen can be, and ordinarily is, hydrolyzed to gelatin under extremely mild conditions so that the gelatin is low in color, bland in taste and has the power of forming gels. This property of gelation which makes it useful in many food applications is disadvantageous for other purposes.

Non-gelling proteinaceous material derived from collagen and associated proteins can be isolated from bones, skins, hides, sinews, fatty tissues, and similar raw materials by subjecting them to high temperatures and pressures with steam and/or water. If the pressure is high enough and the time of treatment long enough, the ability of the collagen derivative to gel is largely destroyed. By non-gelling collagen derivative we mean one in which the residual gelling tendency, if present, is too weak to be of practical value where gelling properties are desirable. For example, while our non-gelling protein at high concentrations of about 50% in water may gel at refrigerator temperatures, the gel is too concentrated to be of practical value. However, when proteins are altered to obtain a non-gelling type of material by subjecting the raw material to high pressures in the presence of water and/or steam, the resulting mixture of proteinaceous materials which is brought into solution with water is dark in color and has an objectionable odor and flavor. For this reason such soluble proteinaceous materials have found only very limited usage in the food and pharmaceutical industries.

For example, in the wet rendering of edible fat from fatty tissues, the protein material of the tissues and associated skin is partially dissolved in the water used to render the fat at pressures which are ordinarily in the range of 20 to 60 pounds. That portion of the protein which has not been hydrolyzed and dissolved, called cracklings, is removed from the rendered fat and from the protein solution by settling and by filtration. The soluble proteinaceous material is produced in large quantities, for example, from the wet rendering of pork or beef fatty-tissues in the production of prime-stem lard or edible tallow. The soluble protein in this tank water, as it is called, has only a slight, if any, tendency to gel even when made into concentrated solutions. As mentioned above, it has a strong flavor and is dark brown in color. While we prefer to use the proteinaceous derivative obtained in the tank water from the production of lard and edible tallow because it is readily available and low in cost, we do not wish to limit ourselves since other raw materials, such as bones, pig skin or other collagen-containing material are entirely suitable for the production of these heat-hydrolyzed soluble meat by-product proteins.

One of the principal objects of this invention is the elimination of a greater part of the color from the soluble protein. The cause of the dark color, and possibly the off-flavors as well, of the heat-hydrolyzed protein associated with such processes is not known with certainty. However, it is believed to be due in part at least to the so-called browning reaction which is a reaction of a reducing sugar such as glucose with the free amino groups of protein.

We have discovered that the objectionable color, odor and flavor properties which render this proteinaceous material objectionable can be eliminated and the proteinaceous material rendered useful as a food additive or for other purposes by treating a water solution of a non-gelling derivative of collagen with bleaching agents capable of freeing nascent oxygen and thereafter mixing the bleached aqueous solution with water miscible dehydrating agent, particularly monohydric alcohols, and ketones of low molecular weight to dissolve and remove the materials with the bad odor and flavor and to precipitate the useful proteinaceous fraction.

When solutions of the proteinaceous material of the non-gelling type are treated with sufficient amounts of bleaching agents such as hydrogen peroxide, sodium peroxide, barium peroxide, and the like, the color improves as the alkalinity of the reacting protein solution is increased. Color in these solutions can be measured by the Lovibond color scale. The Lovibond color readings are run on 1% by weight solutions of the treated proteins.

Best bleaching results are obtained at alkaline pH values of about 8 to about 12 depending upon the character of the base or alkali used to adjust the pH of the proteinaceous solution before addition of bleaching agent. If a use of the finished product is such that a slight cloudiness is permissible the pH may be adjusted with ammonia, ammonium hydroxide, alkali metal oxides, alkali metal hydroxides and alkali metal carbonates. For example, sodium hydroxide, sodium carbonate, potassium hydroxide, potassium carbonate and the like may be used. When solutions of protein were treated with 7½% hydrogen peroxide on a by weight protein solids basis at various pH values, using HCl and NaOH for the pH adjustments, the colors of the resulting solutions by the Lovibond test were as follows:

TABLE 1

| pH Value of Bleach Treatment | Color (1% solutions) | |
|---|---|---|
| | Red | Yellow |
| 4.2 | 2.7 | 20.0 |
| 6.0 | 1.7 | 10.0 |
| 8.0 | 1.0 | 3.1 |
| 10.0 | 0.5 | 2.1 |
| 12.0 | 0.7 | 2.1 |
| Untreated control | 6.0 | 20.0 |

It can be seen from the above color readings that best results are obtained at alkaline pH values. If color is not an important consideration, the bleaching step may be by-passed and a foaming product obtained which has been treated to improve odor and flavor.

Certain of the alkaline earth metal bases are preferred for adjustment of the pH of the proteinaceous solution because under otherwise identical conditions they give improved color, a sparkling clear solution and form salts which are substantially completely precipitated from solution. When using lime or barium hydroxide and the like, pH values of 11 or above are required to obtain a clear neutralized supernatant liquor by gravity settling. Bleaching at still higher pH, such as at a pH of 12.3, is necessary if the clear supernatant liquor is to be obtained by centrifuging. Bleaching of solutions adjusted with lime can be carried out at lower pH values of the order of 11 to 12 if the solution is heated prior to centrifuging. The amount of sparkling clear solution obtained is always increased by heating the neutralized solution irrespective of the method of separating solids from liquids.

Other conditions being identical, color removal increased with increasing amounts of peroxide up to about 11% $H_2O_2$ on a solids basis. Amounts in excess of this figure fail to produce any appreciable improvement in color. Color removal efficiency of peroxide was greatly enhanced at the higher pH values, for example, at pH 10, 5% by weight of peroxide was needed to accomplish approximately the same degree of bleaching as could be obtained with 10% of peroxide at a pH of approximately 8.

While any alkali can be used to adjust the pH of the protein solution, we prefer to use lime. For example, under otherwise identical conditions the adjustment of the pH of the protein solution to 9.0 with sodium hydroxide prior to bleaching resulted in a protein (1% solution) with a color of 1.2 Red 3.1 Yellow while the addition of hydrated lime $Ca(OH)_2$ gave a protein which had a color (1% solution) of 0.5 Red 2.1 Yellow.

There is another advantage in the use of alkaline earth metal bases such as lime. Most of the salts produced when the solution is later neutralized with acid can be removed by the addition of sulfuric acid, phosphoric acid, tartaric acid, and the like after the bleach operation is completed. Ordinarily the acid is added to adjust the pH to less than 7, generally to between a pH of 6 and 7 and preferably to about 6.5. The resulting precipitate of insoluble calcium salt is removed by settling, filtration, centrifuging or combinations thereof.

Water soluble peracids can also be used as the bleaching agent. No pH adjustment of the protein solution is required when peracids are used since results at acid pH values are equal to or better than those obtained at alkaline pH values.

The concentration of protein solution to be decolorized is largely governed by the concentration available and limitation placed by viscosity and foaming when the hydrogen peroxide is added. In general, solutions containing from about 0.1% to about 75% by weight of proteinaceous material may be advantageously decolorized.

If the starting solution is a lard tank water, the concentration of proteinaceous material seldom exceeds about 10% by weight.

For some purposes it is desirable to process the tank water in the dilute form as it comes from the cook tanks. This is especially true where a clarified protein is required for such uses as a beer foam adjunct and for other purposes.

There are, however, many advantages to the use of concentrated protein solutions as a starting raw material since they have good keeping qualities and hence can be stored for long periods of time while the dilute tank water soon spoils as a result of bacterial growth. It was found that as the concentration of protein was increased better bleaching was obtained at lower pH values. However, when the bleaching agent was added to the concentrated solution, excessive foaming occurred. This foaming is believed to be caused by rapid decomposition of the peroxide due to peroxidase which had formed as a result of slight growth of organisms, probably mold, in or on the surface of the protein solution. When the concentrated protein solution was heated to and held at a temperature in the range between about 85° C. and about 100° C. for 30 to 60 minutes, the peroxidase was destroyed and the bleach treatment could then be carried out without excessive foaming at pH values on the acid side of neutrality.

Bleaching operations are improved as to speed and color removal by reaction at elevated temperatures. Using lime as the alkali 18 hours of bleaching at room temperature, i.e., about 21° C., is required to attain the same color by Lovibond test as when bleaching for 2 to 3 hours at a temperature in the range between about 90° C. and about 95° C. when bleaching dilute solutions.

The maximum amount of color removal appears to be attained in about 2 to 2½ hours irrespective of the pH adjustment agent, but at elevated temperatures the proteinaceous solution usually attains a commercially acceptable color in about 25 to 30 minutes. A lard water protein originally having a Lovibond color of about 6 Red 20 Yellow, bleached at a pH of approximately 9 with 7½% by weight of the protein solids, of hydrogen peroxide while maintaining a solution temperature of 90° C. to 95° C., shows at 25 minutes' bleaching 0.7 Red 3.0 Yellow and at 2½ hours' bleaching 0.4 Red 1.5 Yellow.

Unfortunately, the protein obtained in the manner described above by bleaching with hydrogen peroxide has a much more objectionable odor and flavor than the original raw material. Another object of this invention, therefore, is to remove this objectionable odor and flavor from the bleached, heat-hydrolyzed proteinaceous material so as to render the product acceptable as a food adjunct.

It has further been discovered that when a solution of the bleached protein is mixed with a precipitating agent, for example, a monohydric alcohol, ketone, etc., or mixtures thereof, a part of the protein is precipitated and a part remains dissolved in the solution of the precipitating agent. The compounds responsible for the objectionable odor and flavor were found to be soluble in the precipitating solution. As a result, it is possible under certain conditions to precipitate a protein which, after removal of the precipitating agent and upon drying was stable in storage, was not hygroscopic and was capable of producing solutions which were extremely bland with regard to odor and flavor. It was further discovered that traces of materials such as fatty acids and other unidentified materials which are able to damage the stability of protein-induced foams are removed by the precipitating agent. As a result, the alcohol-precipitated protein fraction has the ability to produce solutions with exceptional foaming properties.

Useful precipitating agents are the water miscible agents of low molecular weight normally having less than about four carbon atoms in the hydrocarbon group or groups, for example the aliphatic monohydric alcohols such as methyl alcohol, ethyl alcohol, isopropyl alcohol; ketones, such as acetone, methyl ethyl ketone, and the like. While higher molecular weight compounds having the water miscibility character may be used, the high volume ratio of agent to protein solution required limits their commercial feasibility.

The characteristics of the precipitate obtained by the addition of various alcohols to water solutions of the bleached protein are shown in Table 2. The influence of the concentration of the protein solution, of the ratio of protein solids to alcohol, and of temperature are included:

TABLE 2.—PRECIPITATION OF BLEACHED LARD TANK WATER PROTEIN BY THE ADDITION OF METHYL, ETHYL, AND ISOPROPYL ALCOHOLS

| Concentration of Protein Solution, Percent | Alcohol | Ratio, Protein Solution to Alcohol | Ratio, Protein Solids to Alcohol | Temp. of Precipitation, °F. | Characteristics of Precipitate |
|---|---|---|---|---|---|
| 40 | Ethyl-Formula 3A | 1-5 | 1-12.5 | 35 | Flocculent, easily filtered. |
| 40 | ....do.... | 1-4 | 1-10.0 | 35 | Flocculent and gummy spots; difficult to filter |
| 40 | ....do.... | 1-3 | 1-7.5 | 35 | Gummy, not filterable. |
| 40 | Isopropyl | 1-6 | 1-15.0 | 35 | Do. |
| 40 | Methyl | 1-5 | 1-12.5 | 35 | Flocculent, easily filtered. |
| 40 | ....do.... | 1-4 | 1-10.0 | 35 | Do. |
| 40 | ....do.... | 1-3 | 1-7.5 | 35 | Flocculent, with gummy spots. |
| 50 | ....do.... | 1-3 | 1-6.0 | 32 | Flocculent, easily filtered. |

While batch processing can be used to prepare the bleached and deodorized protein of this invention by fractionation with an alcohol, the procedure is clumsy and inefficient.

A continuous protein fractionation process is preferred in which protein solution and precipitating agent are mixed with agitation on a continuous basis in quantities to produce a precipitation medium having a ratio of precipitating agent to water for producing a flocculent precipitate. The liquid plus precipitated solids are then introduced into a stream of precipitating agent in a countercurrent flow system such that precipitate is washed, while settling, with liquid having increasingly higher concentrations of precipitating agent. After passing through substantially pure precipitating agent, for example, absolute ethyl alcohol, the washed protein is collected in a sludge form. In this system, a liquid mixture of water, precipitating agent, unprecipitated proteins, and the odoriferous fraction is continuously removed by overflow from the countercurrent flow system.

In the operation of such a continuous precipitation column, there is a critical range of concentration of alcohol in water at which the proteinaceous material will precipitate in a flooculent, easily alcohol washed form. In general, this alcohol-water solution for best precipitation varies somewhat with precipitating agent. For alcohol solutions such as methyl and ethyl alcohol, this range varies from about 80% to about 95% alcohol. Satisfactory precipitations of a flocculent washable proteinaceous material can be made from solutions having temperatures in the range between about 18° C. and 25° C. Lowering the temperature of the precipitation medium permits use of a wider range of alcohol concentrations for precipitation. Preferably, the precipitations are carried out at temperatures of about −1° C. to about +10° C.

While concentration of a dilute bleached solution is not necessary before treatment with precipitating agent, concentration is an advantage since it reduces the quantity of precipitating agent which must be used in the protein precipitation step.

The bleached, alcohol-fractionated protein material retains a very slight amount of residual alcohol which is probably absorbed by the protein molecules. The removal of the last traces of alcohol is highly desirable because even extremely small amounts can be detected organoleptically and also because any trace of alcohol left attached to the protein molecule has a detrimental effect on the foaming properties of the finished dried protein. It was found that by dissolving the alcohol-precipitated protein fraction in water and by passing this water-alcohol solution of protein through a column of Raschig rings in a direction countercurrent to a blast of steam that the last traces of alcohol were removed from the protein solution. This stripping operation is much simpler than attempting to remove the last traces of alcohol during the drying operation.

Other objects and advantages of the present invention will appear from the more detailed description set forth below, it being understood that such detailed description is given by way of explanation only, and not by way of limitation, since various changes therein may be made by those skilled in the art without departing from the scope and spirit of the present invention.

*Example 1*

One thousand pounds of 6% solids lard tank-water, equivalent to 60 pounds of solids, is adjusted to pH 9.0 with hydrated lime. To this are added 9 pounds of 50% hydrogen peroxide solution and the resulting mixture allowed to stand overnight. The bleach treatment does not proceed normally when appreciable amounts of iron or iron salts are present. Hence we prefer to use tanks made of wood or neoprene lined for the bleaching process. The following day the mixture is adjusted to a pH of 6.6 with phosphoric acid and the mixture centrifuged to remove the suspended solids. The centrifugate is concentrated in an evaporator to 55% solids. To this concentrated protein solution are added 15.9 pounds water and 200 pounds methyl alcohol. At this concentration of alcohol only a very slight trace, if any, of protein is precipitated. This solution of protein is run through a fractionating column at such a rate that one part (by weight) of the protein-alcohol-water solution is fed in at the top of the column while 3.5 parts (by weight) of methyl alcohol are fed in at the bottom of the column previously filled with alcohol. Solids or protein curd are accumulated in a settling chamber and the alcohol plus solids sludge pumped therefrom. Water is added to the curd and this solution is steam-stripped to remove all traces of alcohol. The stripped solution is then dried by whatever means is available, such as drum-drying, spray-drying, tray vacuum drying, etc. Under these conditions the average yield of bleached deodorized protein is about 42 pounds of protein, or 70% yield obtained, from the starting material of this example.

*Example 2*

One thousand six hundred and sixty-six pounds of 6% solids lard tanker-water is filtered or is passed through a centrifuge to remove traces of grease and insoluble material. The tank-water is then evaporated to 58.5% solids. The concentrated protein solution, in a wooded or neoprene lined tank, is heated to and held at 95° C. for one hour. The solution is cooled to 25° C. and to it is then added 15 pounds of 50% $H_2O_2$. The bleach tank is equipped with cooling facilities as the bleach reaction is exothermic. After bleaching overnight 15.9 pounds of water and 200 pounds methyl alcohol are added to the bleached protein. This protein solution is then run through the fractionating column and further treated as described in Example 1.

An analysis of the proteinaceous material used as a raw material in the process and of the finished bleached and alcohol-deodorized protein is shown below in Table 3:

TABLE 3.—ANALYSIS OF DRIED LARD TANK-WATER PROTEIN BEFORE AND AFTER PROCESSING

|  | Original Protein | Processed Protein |
| --- | --- | --- |
| Moisture, Percent | 6.9 | 7.5 |
| Nitrogen, Percent | 14.85 | 15.65 |
| Nitrogen (Moisture-Free Basis), Percent | 15.92 | 16.90 |
| Total Ash, Percent | 6.99 | 2.14 |
| Nitrogen (Moisture- and Ash-Free Basis), Percent | 17.3 | 17.4 |
| Petroleum Ether Solubles, Percent | 0.26 | 0.07 |
| Ross-Miles Foam Test: | | |
| cm. Foam | 3.0 | 16.5 |
| cm. Foam after 5 min | 1.0 | 13.5 |

The finished protein has been found to be an excellent aerating or foaming agent. It can be used to advantage as a foaming adjunct in beer. It is particularly adapted for use in the preparation of frappés, nougats, fudge, cream candies, "seven-minute" and other cake frostings, and for a large number of other uses.

A comparison of the aerating properties of the protein of this invention with egg white and soy bean derivatives in the preparation of frappés is shown in Table 4. Frappés are ordinarily whipped to a weight of 60 to 70 ounces per gallon. The frappé on storage should not show excessive gain in weight (ounces per gallon) due to loss of air. It can be seen from the table that frappés made with the protein of this invention are light in weight and show very little increase in weight on storage.

TABLE 4.—DENSITY AND STABILITY OF FRAPPÉS PREPARED WITH ENZYME HYDROLYZED CORN SYRUP AND 2% OF VARIOUS PROTEIN AERATING AGENTS

| Aerating Agent | Initial Weight Ounces/Gallon | Weight After Overnight Storage at 70° F. Ounces/Gallon |
| --- | --- | --- |
| Egg White | 68 | 77 |
| Protein of this invention | 61 | 72 |
| Soy Bean Product #1 | 61 | 72 |
| Soy Bean Product #2 | 61 | 68 |
| Soy Bean Product #3 | 58 | 76 |

*Example 3*

One thousand pounds of fresh beef shank bones are pressure cooked at 50 pounds gauge pressure with 1000 pounds of water for two hours. The liquid phase is decanted from the bone residue and the aqueous phase separated from the melted fat. The bone residue is again pressure cooked with 666 pounds of water and the aqueous extract isolated. The aqueous extracts are combined, filtered or passed through a centrifuge, then evaporated to 55% solids. 245 pounds of 55% solids protein solution is obtained. This concentrated protein solution is heated to and held at 95° C. for one hour. The solution is then cooled to 25° C. and to it is added 15 pounds of 50% $H_2O_2$. After bleaching overnight, 15.9 pounds of water and 200 pounds of methyl alcohol are added to the bleached protein. This protein solution is then run through the fractionating column and treated as described in Example 1. The precipitated protein or curd is dried on a drum drier.

The finished protein is an excellent aerating and foaming agent. It is equally effective as protein produced from lard tank-water as a foaming adjunct in beer and in the preparation of frappés, candies, cake frostings and the like.

Although the invention has been described in connection with specific embodiments thereof, it will be understood that these are not to be regarded as limitations upon the scope of the invention except insofar as included in the accompanying claims.

We claim:

1. The method of preparing a water soluble proteinaceous material from non-gelling type hydrolyzed protein obtained through treatment of collagen-containing material with heat and water which comprises mixing aqueous solution of said hydrolyzed protein with water miscible precipitating agent selected from the group consisting of alcohols and ketones having 1 to 4 carbon atoms in proportions producing a resultant water-precipitating agent solution having lower solubility for proteinaceous material than the water solution whereby at least a portion of the water soluble proteinaceous material is rendered insoluble and is precipitated and separately recovering precipitated proteinaceous material and resultant solution.

2. The method of claim 1 in which the precipitated protein material is mixed with water, the water mixture contacted with steam to remove traces of precipitating agent and the steam stripped solution heat treated to recover the dry proteinaceous product.

3. The method of preparing a water soluble proteinaceous material from non-gelling type hydrolyzed protein obtained through treatment of collagen-containing material with heat and water which comprises adding to said solution of hydrolyzed protein a basic material selected from the group consisting of ammonia, ammonium hydroxide, alkali metal oxide, alkali metal hydroxide, alkali metal carbonate, alkaline earth metal oxide, alkaline earth metal hydroxides and mixtures thereof to adjust the pH of the solution to between 8 and 12.3, bleaching said pH adjusted solution through reaction with nascent oxygen, adding acid to said bleached solution to adjust the pH to between 6 and 7, admixing said pH adjusted bleached solution with water miscible precipitating agent selected from the group consisting of alcohols and ketones having 1 to 4 carbon atoms in proportions producing a water-precipitating agent solution having lower solubility for proteinaceous material than the water solution whereby at least a portion of the water soluble proteinaceous material is rendered insoluble and precipitates and separately recovering precipitated proteinaceous material and resultant solution.

4. The method of preparing a water soluble proteinaceous material from non-gelling type hydrolyzed protein obtained through treatment of collagen-containing material with heat and water which comprises heating said aqueous solution of hydrolyzed protein to a temperature between 85° C. and 100° C. for a period of at least 30 minutes, bleaching said heat treated solution through action of nascent oxygen, mixing the bleached aqueous solution with water miscible precipitating agent selected from the group consisting of alcohols and ketones having 1 to 4 carbon atoms, in proportions producing a resultant water-precipitating agent solution having lower solubility for proteinaceous material than the water solution whereby at least a portion of the water soluble proteinaceous material is rendered insoluble and is precipitated and separately recovering precipitated proteinaceous material and resultant solution.

5. The method of preparing a water soluble proteinaceous material from non-gelling type hydrolyzed protein obtained through treatment of collagen-containing material with heat and water which comprises mixing bleached solution of said hydrolyzed protein with substantially anhydrous water-miscible precipitating agent selected from the group consisting of alcohols and ketones having 1 to 4 carbon atoms continuously in proportions producing a resultant water-precipitating agent solution having lower solubility for proteinaceous material than the water solution, said precipitating agent being fed in an upwardly direction and being mixed with said bleached solution of hydrolyzed protein whereby a concentrated solution of precipitating agent containing water is discharged in the direction of flow of said precipitating agent and the proteinaceous material precipitating from said bleached solution settles countercurrent to the upwardly flowing precipitating agent whereby the settling precipitated proteinaceous material is washed with substantially anhydrous precipitating agent and separately recovering precipitated proteinaceous material and resultant water-precipitating agent solution.

6. The method of preparing a water soluble proteinaceous material from lard tank water comprising adding hydrated lime to said lard tank water in quantities to produce a pH in the solution between 8 and 12.3 adding hydrogen peroxide to said lime treated tank water to bleach said solution through reaction with nascent oxygen, adding phosphoric acid to the bleached tank water to adjust the pH to below 6.6 whereby insoluble salts of calcium are formed as suspended solids, centrifuging the phosphoric acid-treated solution to remove the suspended solids, removing water to produce a concentrated centrifugate, adding methyl alcohol to the concentrated centrifugate in proportions avoiding any substantial precipitation of protein, admixing alcohol-diluted centrifugate with substantially anhydrous methyl alcohol in a mixing zone in which methyl alcohol-diluted centrifugate is fed adjacent the top of the zone and substantially anhydrous methyl alcohol is fed adjacent the bottom of the zone, accumulating precipitated proteinaceous material at the bottom of said mixing zone, removing precipitated proteinaceous material and substantially anhydrous alcohol from the bottom of said zone and removing a methyl alcohol-water solution from the top of said mixing zone.

7. The proteinaceous material consisting essentially of a fraction of water soluble proteinaceous material which is obtained from nongelling type hydrolyzed protein through treatment of collagen-containing material with heat and water, said fraction being insoluble in concentrated solution of water miscible precipitating agent selected from the group consisting of alcohols and ketones having 1 to 4 carbon atoms.

8. A proteinaceous food adjunct having foaming properties consisting essentially of a fraction of water soluble proteinaceous material obtained from non-gelling type hydrolyzed protein through treatment of collagen-containing material with heat and water which is insoluble in concentrated methyl alcohol.

No references cited.